US012508340B2

(12) United States Patent
Bergenek

(10) Patent No.: US 12,508,340 B2
(45) Date of Patent: Dec. 30, 2025

(54) LIGHTING DEVICE FOR DISINFECTING AIR IN AN ENVIRONMENT

(71) Applicant: LEDVANCE GmbH, Garching bei Munchen (DE)

(72) Inventor: Krister Bergenek, Regensburg (DE)

(73) Assignee: LEDVANCE GmbH, Garching bei Munchen (DE)

( * ) Notice: Subject to any disclaimer, the term of this patent is extended or adjusted under 35 U.S.C. 154(b) by 298 days.

(21) Appl. No.: 17/671,684

(22) Filed: Feb. 15, 2022

(65) Prior Publication Data

US 2022/0265889 A1 Aug. 25, 2022

(30) Foreign Application Priority Data

Feb. 19, 2021 (DE) .......................... 102021103961.4

(51) Int. Cl.
*A61L 9/20* (2006.01)
(52) U.S. Cl.
CPC ............ *A61L 9/20* (2013.01); *A61L 2209/111* (2013.01); *A61L 2209/12* (2013.01)
(58) Field of Classification Search
None
See application file for complete search history.

(56) References Cited

U.S. PATENT DOCUMENTS

| 2009/0117000 A1* | 5/2009 | First | A61L 9/20 422/24 |
| 2022/0008595 A1* | 1/2022 | Sood | A61L 9/22 |

FOREIGN PATENT DOCUMENTS

| CN | 102986302 A | * | 3/2013 | ......... H05B 41/2806 |
| KR | 101939355 B1 | * | 1/2019 | ................ F21V 7/22 |

* cited by examiner

*Primary Examiner* — Andrew Smyth
(74) *Attorney, Agent, or Firm* — Hayes Soloway PC

(57) ABSTRACT

A lighting device for disinfecting air in an environment is provided. The lighting device comprises at least one UVC light source for generating a UVC light. The lighting device further comprises a beam-shaping element for shaping the UVC light into a UVC beam, and a beam-reflecting element for substantially completely capturing the UVC beam. The beam-reflecting element is connected downstream of the beam-shaping element in such a way that between the beam-shaping element and the beam-reflecting element there is a disinfection space for air disinfection which is freely accessible to the air, and wherein the beam-reflecting element is further adapted to radiate the detected UVC beam in a controlled manner.

21 Claims, 5 Drawing Sheets

LIGHTING DEVICE FOR DISINFECTING AIR IN AN ENVIRONMENT

CROSS-REFERENCE TO RELATED APPLICATIONS

This patent application claims priority from German Patent Application No. 102021103961.4, filed on Feb. 19, 2021, which is herein incorporated by reference in its entirety.

TECHNICAL FIELD

The invention relates in general to lighting devices. More specifically, the invention relates to lighting devices for air disinfection in an environment.

BACKGROUND

Lighting devices with UVC (or UV-C) light sources are known for generating short-wave ultraviolet light, which is capable of destroying viruses and bacteria. Low-pressure mercury vapour lamps, excimer lamps, and, in particular, UVC LEDs (light-emitting diodes) are used as light sources. Widespread use of such light sources in places where people are present could significantly reduce the risk of infection for humans. However, UVC radiation is not harmless to humans and can cause eye and/or skin damage in people. So-called open lighting devices are also known, in which the UVC light is emitted into the environment. In order not to endanger human health, such lighting devices must be switched off when people are present, which requires additional effort for room monitoring and control of the lighting devices. Furthermore, so-called closed lighting devices, which are practically inaccessible to UVC radiation, are known in which the air is guided through enclosed air ducts under UVC irradiation. To increase the throughput, high air pressures are often used, which can lead to turbulence and to the stirring up and spreading of dangerous germs in the surrounding air.

SUMMARY

It is an object of the present invention to provide a lighting device for air disinfection in an environment which enables efficient and safe air disinfection in the presence of people.

To solve this task, a lighting device for air disinfection in an environment is proposed. The lighting device comprises at least one second light source designed as a UVC light source for generating a UVC light. The at least one second light source can, in particular, be designed as a UVC light-emitting component, illuminant, luminaire, and/or as a device for receiving such a light source.

The lighting device further comprises a beam-shaping element for shaping the UVC light into a UVC beam, and a beam-reflecting element for substantially completely capturing the UVC beam. The beam-reflecting element is positioned downstream of the beam-shaping element such that a disinfection space for air disinfection is provided between the beam-shaping element and the beam-reflecting element which disinfection space is freely accessible to the air, wherein the beam-reflecting element being further adapted to emit the detected UVC beam in a controlled manner.

The lighting device can, in principle, be any type of lighting device, for example, a wall lamp, ceiling lamp, street lamp, outdoor lamp, floor lamp, or desk lamp. The visible light source can, in principle, be any type of visible light source. In particular, the visible light source may be an LED light source with one or more LEDs or an LED light engine. In particular, the first light source may be an illumination light source for illuminating the environment. In principle, any type of environment can be considered as an environment. In particular, the environment may comprise one or more closed and/or at least partially open spaces to be illuminated.

The UVC light source can basically be any type of UVC light source. In particular, the UVC light source may be designed to generate a UVC light in the wavelength range from 100 nm to 280 nm. In particular, the UVC light source may be designed to generate UVC radiation in the wavelength range between 220 nm and 280 nm, which is suitable for disabling bacteria and viruses by destroying their DNA or RNA. For example, the UVC light source may comprise a UVC LED light engine and/or a low-pressure discharge lamp. The UVC light source may comprise UVC LED dies and/or chip-scale packages (CSP) containing UVC LEDs.

The beam-shaping element can, in particular, be designed as a UVC optical element, such as a reflector, reflector array, lens, and/or lens array for shaping the UVC beam. The beam-reflecting element can, in principle, be any reflecting element which is suitable for capturing the UVC beam and radiating it in a controlled manner, in particular, by reflection and/or scattering.

Due to the substantially complete detection by the beam-reflecting element and the controlled radiation of the UVC beam, the UVC radiation emitted into the environment or the risk of damage to health by UVC radiation for people can be reduced or avoided. In particular, the intensity of the UVC light emitted into the environment can be reduced to such an extent that the lighting device can be operated even when people are present.

Inside the disinfection space, which is freely accessible to the air, the air can constantly renew itself, for example, by natural convection, so that the air can also be disinfected outside the disinfection space, in particular, in the entire environment.

The beam-shaping element can be designed to shape the UVC beam in the form of a light cone with a predefined maximum aperture angle. The maximum aperture angle is understood here as the maximum aperture angle of the light cone in the far field, at a much greater distance from the UVC light source than the geometric dimensions of the UVC light source itself. In particular, the maximum aperture angle can be selected in such a way that, when the beam-shaping element and the beam-reflecting element are positioned in accordance with the application, essentially the entire UVC beam is captured by the beam-reflecting element. The maximum aperture angle thus also defines an intersection angle over which practically no appreciable emission of UVC radiation takes place. By limiting the aperture angle of the light cone, it can be ensured that there is no uncontrolled radiation of the UVC light into the environment.

In some embodiments, the beam-reflecting element is configured to reflect at least a portion of the detected UV light back to the beam-shaping element. Part of the UV light can thus pass through the disinfection space both on the way there—from the beam-shaping element to the beam-reflecting element—and on the way back—from the beam-reflecting element to the beam-shaping element. Thus, a kind of recycling of the UV light takes place, whereby the disinfection effect in the disinfection room can be intensified without exposing the environment to more UVC radiation.

The beam-reflecting element can be designed, in particular, in the form of a concave reflector. Due to the concavity of the beam-reflecting element, the UV beam can be bundled and reflected back onto the beam-shaping element, so that the UV exposure of the surroundings can be avoided or reduced.

In particular, the beam-reflecting element may be in the form of a spherical reflector. With the aid of the spherical reflector, it can be easily ensured that the light reflected back from the beam-reflecting element is substantially reflected back onto the beam-shaping element. For example, if the UVC light source or beam-shaping element is positioned so that the UVC light impinges substantially radially on the spherical reflector, the light reflected back from the beam-reflecting element is also focused radially at its point of origin. The dimensioning or relative positioning of the beam-reflecting element and the beam-shaping element can be done with the help of simple geometric formulae. The beam-reflecting element can also have the shape of a parabolic reflector, a free-form reflector, and/or a segmented reflector and be designed in such a way that the UVC light reflected by the beam-reflecting element is emitted in a controlled manner, in particular, back onto the beam-shaping element.

The lighting device can be designed as a ceiling luminaire or a pendant luminaire. In particular, the lighting device can be designed in such a way that the disinfection space is located near the ceiling or above a certain height from the floor when the lighting device is mounted. In some embodiments, the lighting device is designed such that the disinfection space is located at a minimum height of 2 m from the floor when the lighting device is mounted. The high positioning of the disinfection space can, in particular, ensure that people do not look directly into the UVC light source and do not enter the disinfection space with body parts without intention.

The lighting device can be designed in such a way that the UVC light source radiates in the direction of the room ceiling when the lighting device is mounted. In particular, the UVC light source can be designed in such a way that it cannot be directly seen by people when mounted. For example, the lighting device can be designed so that it can be mounted at a room height of 2 m above the floor. The mounting height can ensure that people cannot see directly into the disinfection volume or UVC beam from above.

The beam-reflecting element may, for example, be mountable near the ceiling, wherein the first light source including UVC light source and beam-shaping element may be suspended from the ceiling by fasteners or fastening cables of a fastening mechanism. The fastening mechanism may further be a height-adjustable fastening mechanism that allows the fastening height to be easily adjusted. For example, in rooms with high ceilings, a greater fastening height or distance between the beam-shaping element and the beam-reflecting element can be adjusted. A larger distance between the beam-shaping element and the beam-reflecting element results in a larger disinfection volume, so that more air can be disinfected at the same time.

In some embodiments, the lighting device comprises control electronics for controlling the UVC light source and a sensor system with one or more sensors for providing current sensor information, wherein the control electronics are configured to control the UVC light source based on the current sensor information provided by the sensor system. A lighting device equipped with the control electronics and the sensors can thus be controlled depending on the situation.

In some embodiments, the sensor system comprises a safety sensor for providing safety-relevant sensor information, wherein the control electronics are configured to control the UVC light source based on the safety-relevant sensor information.

The sensor system can, in particular, comprise a presence sensor for detecting a presence in the disinfection space, wherein the control electronics can be designed to switch off the UVC light source if the sensor information indicates the presence of an object or a foreign body in the disinfection space.

The presence sensor can be designed as a pyroelectric or PIR sensor, radar sensor, runtime or ToF sensor, or similar.

The sensor for detecting objects can support the safe use of the lighting device and transmit a signal to switch off the UVC light source to the control electronics if required (e.g., in the event that human body parts are located in the disinfection volume). This may be the case, for example, during maintenance work or unauthorized handling of the lighting device.

The sensor system can comprise a UVC sensor for detecting the UVC radiation. In particular, the UVC sensor may be designed to detect UVC radiation in the disinfection chamber. For example, the UVC sensor may be mounted within the disinfection chamber. The UVC sensor may further be designed to measure the intensity of the UVC radiation in the disinfection space and to transmit measurement signals representing the intensity of the UVC radiation to the control electronics. A low intensity of UVC radiation in the disinfection volume can, for example, serve as an indication of a poorly formed reflection of the UVC beam, a missing, defective, or incorrectly mounted beam-reflecting element. The control electronics can be configured to switch off the UVC light source in such a case in order to avoid a malfunction of the lighting device or an uncontrolled emission of the UVC light. The UVC sensor can also detect a weakening or degradation of the UVC light source at an early stage and, if necessary, display a recommendation to replace the UVC light source.

The sensor system can also comprise one or more presence sensors for detecting persons in the surroundings or in the room to be illuminated and for transmitting current presence information to the control electronics. The person presence sensors can be directed, in particular, downwards, towards the possible presence area of persons. The presence or the degree of presence of persons can be determined, for example, on the basis of movements detected by a PIR sensor or by counting persons by means of a radar sensor. The control electronics can be designed to control the lighting device based on the current person presence information. The lighting device can thus be controlled taking into account the presence of persons in the room to be illuminated. The control electronics may be configured to activate the UVC light source when the presence of one or more persons is detected, in order to protect the persons present by disinfecting the air. The control electronics can also be configured in such a way that the total intensity of the UVC radiation is throttled when people are present in order to reduce the intensity of the UVC light scattered into the environment, if necessary.

The sensor system may comprise an air quality sensor for detecting one or more air quality parameters and for transmitting current air quality information to the control electronics, wherein the control electronics are configured to control the lighting device based on the current air quality information.

An air quality sensor, in particular, a sensor for measuring VOCs (Volatile Organic Components), CO2, and/or humidity, can measure the air quality in the room and enable conclusions to be drawn about the number of people in the room. From the air quality and/or the number of people, further conclusions can be drawn about the possible number of viruses or bacteria in the room. The control electronics can be configured or programmed to determine the intensity or duration of UVC radiation required for disinfection. By checking the air quality, the intensity of the UVC radiation in the disinfection volume and the energy consumption of the UVC light source can be optimized.

In some embodiments, the lighting device comprises a light source generating a visible light for forming a beam of visible light, in particular, colored or monochromatic light, substantially overlapping with the UVC beam. By overlapping or coupling the visible light beam with the UVC light beam, it can be achieved, in particular, that the operation of the UVC light source can be visually recognized. The visualisation of the UVC beam or the UVC light cone can serve as an indication of the presence of the dangerous UVC light in the visualized light cone. For example, the visual light source radiating towards the ceiling of the room coupled with the UVC light source provides an intuitive visual confirmation of the functioning of the UVC light source. In addition, the cone of visible light coupled with the UVC light source shows where the UVC radiation arrives or does not arrive, which can serve, for example, as an indication of correct or incorrect mounting of the lighting device. An incorrectly mounted lighting device, for example if the distance between the UVC light source and the beam-reflecting element is too large, could be easily recognized, for example, by the colored light on a ceiling element next to the beam-reflecting element.

In one embodiment, the UVC light source comprises UVC LED dies and/or chip-scale packages (CSP). The UVC LED dies or CSD may be mixed with LED dies or CSP (e.g., blue, green, or red) to generate a visible light on a circuit board, thus forming a chip-on-board or CSP light engine. This technical arrangement allows the coupled visual light source and the UVC beam to radiate in the same direction and form substantially overlapping light cones or illumination patterns in the far field.

In some embodiments, the lighting device comprises at least one further light source or additional light source for generating a visible light. The additional light source can, in particular, be designed as a light source for general illumination. The additional light source may, in particular, be designed as a light-emitting component, illuminant, luminaire, and/or a device for accommodating such a light source that is independent of or autonomous from the UVC light source. In some embodiments, the additional light source is in the form of a ceiling light or a pendant light. In some embodiments, the UVC light source and the additional light source are housed in a common housing or in a common luminaire body.

BRIEF DESCRIPTION OF THE DRAWINGS

The invention is now explained in more detail with the aid of the attached figures. The same reference signs are used in the figures for identical or similarly acting parts.

DETAILED DESCRIPTION

Figure 1:
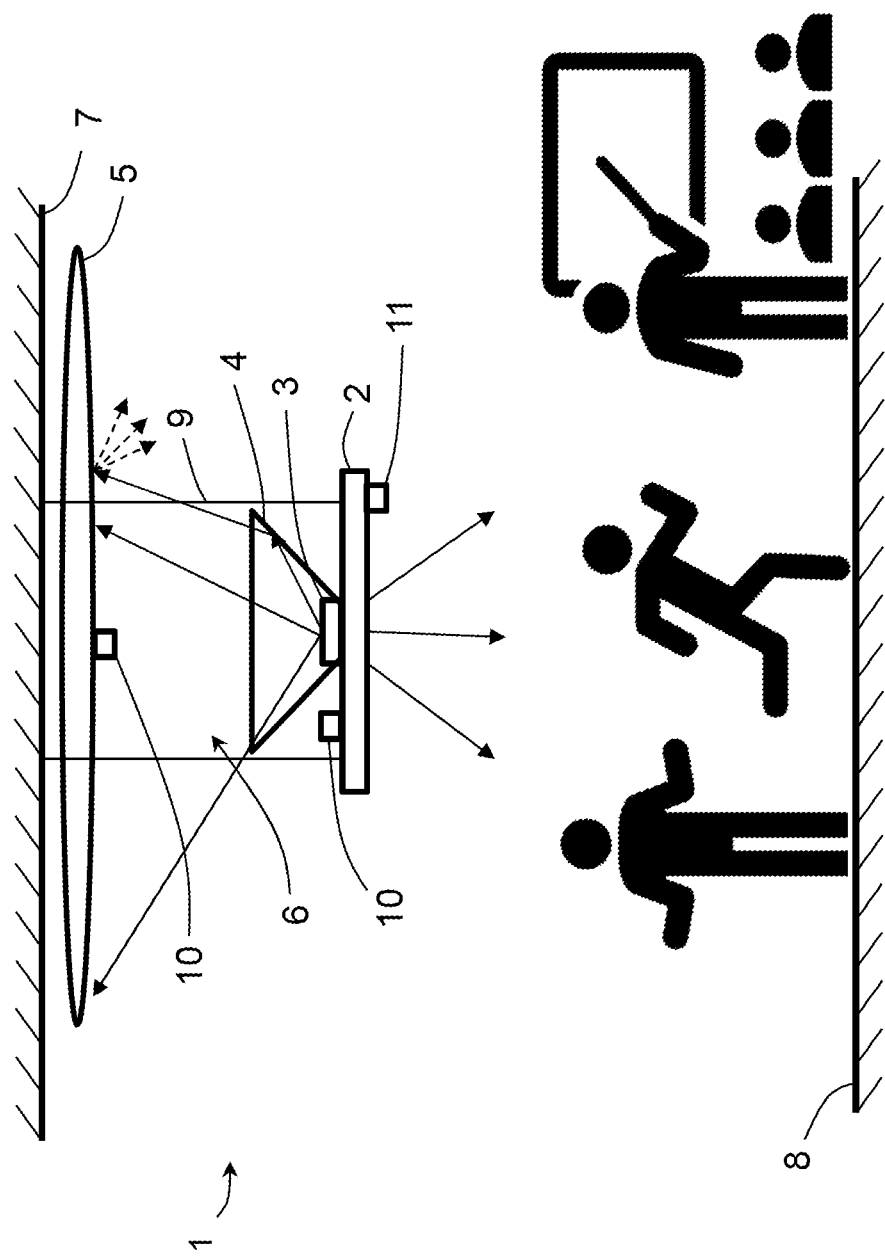
FIG. 1 schematically shows a lighting device according to an embodiment example, FIG. 2 schematically shows a lighting device according to a further example.

FIG. 1 schematically shows a lighting device 1 according to an example. The lighting device 1 comprises a first light source 2 for generating a visible light and a second light source 3 for generating a UVC light. The lighting device 1 further comprises a beam-forming element 4 and a beam-reflecting element 5. Between the beam-forming element 4 and the beam-reflecting element 5 there is a disinfection space 6 which is freely accessible from the outside.

In the embodiment shown, the first light source 2 is designed as a suspended luminaire or a pendant luminaire which is mounted on a ceiling 7 (e.g., in a room). To illustrate the positioning of the lighting device 1 in the room, the floor 8 and people in the room are shown symbolically.

The lighting device 1 further comprises a height-adjustable fastening mechanism 9, which allows to adjust the fastening height of the first light source 2, the second light source 3 and the beam-shaping element 4 with respect to the floor 8 or the ceiling 7. The beam-reflecting element 5 is positioned in close proximity to the ceiling 7. The fastening mechanism 9 comprises fastening ropes along which the height positioning of the light sources 2, 3 or the beam-reflecting element 5 can be carried out.

The beam-shaping element 4 and the beam-reflecting element 5 are positioned and coordinated in such a way that the UVC beam shaped by the beam-shaping element 4 is substantially completely captured by the beam-reflecting element 5. The beam path of the UVC light is clarified by means of exemplary beams, which are shown as arrows directed from the first light source 2 to the beam-reflecting element 5.

Some of the UVC rays first reach the inner surfaces of the beam-shaping element 4 and only then the beam-reflecting element 5. Some of the UVC rays, on the other hand, reach the beam-reflecting element 5 without first coming into contact with the inner surfaces of the beam-shaping element 4. The totality of these UVC rays then forms the UVC light cone which extends between the beam-shaping element 4 and the beam-reflecting element 5. In some embodiments, the UVC light source 3 or beam-shaping element 4 is configured such that all UVC rays are incident on the reflector of the beam-shaping element 4 before they can leave the beam-shaping element. In this way, direct irradiation of objects or people by the UVC radiation can be avoided, even in the event of incorrect installation of the lighting device 1. The beam path of the visible light is illustrated by arrows pointing downwards. In this example, the first light source 2 is designed to emit visible light downwards by means of a lower illuminated surface.

In the embodiment shown, the lighting device 1 comprises safety sensors 10 for providing safety-relevant sensor information and an activity sensor 11 for providing activity-relevant sensor information. The information provided by the sensors can be evaluated by an evaluation unit of a control electronics (not shown). The control electronics can, in particular, be designed to control the lighting device 1 based on the information detected by the sensors, via corresponding driver electronics (not shown). In this embodiment example, the safety sensors 10 are designed as presence sensors, which are attached to the beam-reflecting element 5 and to the first light source 2. The presence sensors are designed to detect the presence of objects or human body parts between the UVC light source 3 and the beam-reflecting element 5. The control electronics can be configured to switch off the UVC light source 3 as soon as the sensor information indicates the presence of an object or a foreign body in the disinfection space 6. Depending on the embodiment, the number and arrangement of sensors may change. In some embodiments, the lighting device 1 comprises a UVC sensor which is functionally connected to the control electronics and is designed to detect the UVC beam intensity in the disinfection space 6. In some embodiments, the UVC sensor is mounted on the side of the beam-reflecting element 5 facing the beam-shaping element 4.

In this embodiment example, the beam-shaping element 4 is designed as a reflector for shaping the UVC beam or UVC light cone with a maximum aperture angle. The maximum aperture angle can be selected, in particular, so that, when the beam-shaping element 4 and the beam-reflecting element 5 are positioned in accordance with the application, essentially the entire UVC beam is captured by the beam-reflecting element 5. By restricting the aperture angle of the light cone to the maximum aperture angle, it can be ensured that there is no uncontrolled radiation of the UVC light into the surroundings through the ceiling 7.

The shape and dimensions of the disinfection space 6 is defined by the light cone of the UVC beam or primary UVC light between the beam-shaping element 4 and the beam-reflecting element 5. In the embodiment example shown, the disinfection space 6 has a height of about 1 m and a diameter of about 1.2 m, which corresponds approximately to the diameter of the beam-reflecting element 5. The volume of the disinfection space 6 or the disinfection volume is thus about 0.38 m$^3$.

The beam-reflecting element 5 may be designed to reflect at least part of the detected UVC beam back to the beam-shaping element 4. This type of UVC light recycling can contribute to the enhancement of the disinfection effect in the disinfection space (chamber) 6 or to the energy-saving operation of the lighting device 1. Because of the back reflection of the UVC light onto the beam-shaping element 4, the same intensity of the UVC light can be achieved in the disinfection space (chamber) 6 with a lower power consumption of the UVC light source 3.

Depending on the embodiment example, the beam-reflecting element 5 may have different surface properties or reflection and scattering properties. In some embodiments, the beam-reflecting element 5 has a specular reflective surface. Due to the specular reflection, the UVC light emitted from the beam-reflecting element 5 can be precisely controlled. In some embodiments, a portion of the light from the beam-reflecting element 5 is scattered into the environment, particularly diffusely. This diffuse scattering of the UVC light into the environment is symbolically represented by dashed arrows in FIG. 1.

The reflective or scattering properties of the beam-shaping element 5 or the intensity of the UVC light can be chosen so that people in the space to be illuminated are not exposed to dangerous doses of radiation. In particular, the choice of these parameters can ensure that the UVC light reflected from the beam-shaping element 4 is either too weak to endanger the safe presence of people in the environment and/or is reflected back to the beam-shaping element 4, in particular, for UVC light recycling. The maximum aperture angle or the intersection angle and the distance between the UVC light source 3 and the beam-reflecting element 5 can, in particular, be selected such that almost 100%, in particular more than 90% or more than 95% of the UVC light emerging from the beam-shaping element 4 reaches the beam-reflecting element 5. The maximum opening angle θ can be between 10° and 45°, in particular, between 25° and 45°.

Figure 2:
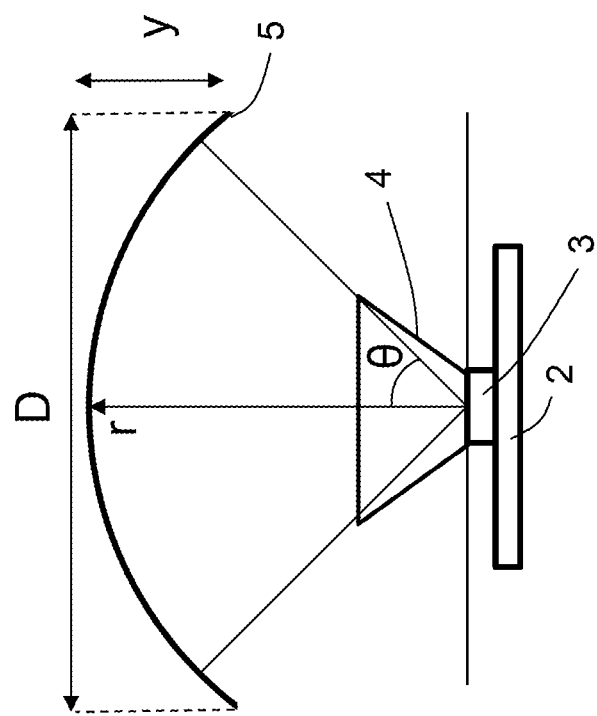

FIG. 2 schematically shows a lighting device 1 according to a further embodiment. In this embodiment, the beam-reflecting element 5 is mirror-reflecting in the form of a spherical reflector with a radius of curvature r. The UVC light source 3 is arranged essentially in the geometric centre of the spherical reflector. The beam-shaping element 4 is in the form of a substantially conical or funnel-shaped reflector. In principle, the beam-shaping element 4 can also be designed as a lens optic.

The beam-reflecting element 5 has a diameter D and a depth y. FIG. 2 also shows the maximum aperture angle θ of the UVC light cone, which is determined by the beam-shaping element 4. As the illustration of FIG. 2 makes clear, the spherical geometry considerably simplifies the design and dimensioning of individual components. In particular, the dimensioning of the elements can be carried out according to the available room height or according to the specified size of the beam-reflecting element 5 with the aid of simple geometric formulae. For example, if the height or radius of the spherical reflector r and the maximum aperture angle θ of the beam-shaping element 4 are specified, the minimum diameter of the beam-reflecting element 5 can be determined in a simple manner by the formula d=2r*sin 30° from which the minimum depth y of the beam-reflecting element 5 also results. With an intersection angle of 30° of the beam-shaping element 4 and a radius of 1 m, the minimum diameter of the beam-reflecting element 5 is thus 1 m. The minimum depth y of the beam-reflecting element 5 is then y=(1−cos 30°)=0.14 m.

In one embodiment, the beam-reflecting element 5 has a substantially specularly reflecting spherical reflecting surface with a radius of 1 m, wherein the beam-shaping element 4 has an aperture angle of 45°. In such a case, the minimum diameter of the beam-reflecting element 5 is d=2r*sin 45°=1.41 m. The depth y of the beam-reflecting element 5 is then y=(1−cos 45°)=0.29 m.

The diameter of the beam-reflecting element 5 can, in particular, be selected larger than the determined minimum diameter, in particular, with a reserve due to any uncertainties or tolerances. In particular, the diameter d of the beam-reflecting element 5 can be selected so that the following condition is fulfilled: 2r*sin θ<d<4r*sin θ.

The distance d between the second light source 3 or UVC light source and the beam-reflecting element 5 can be selected such that ½r<d<3/2r. At such a distance between the UVC light source 3 and the beam-reflecting element 5, part of the UVC light reflected by the beam-reflecting element 5 can be captured by the first light source 2 and/or by the second light source 3.

The UVC light source 3 can be substantially circular, in particular, planar, which means that the beam-shaping element 4 or the beam-reflecting element 5 can be cylindrical or spherical. In some embodiments, the UVC light source 3 is in the form of a linear light source. In such a case, the beam-shaping element 4 may have a linear shape along the UVC light source 3 and a curved shape perpendicular to the UVC light source 3. The parameters d, r, and θ discussed above can then be applied accordingly in a plane perpendicular to the UVC light source 3.

Figure 3:
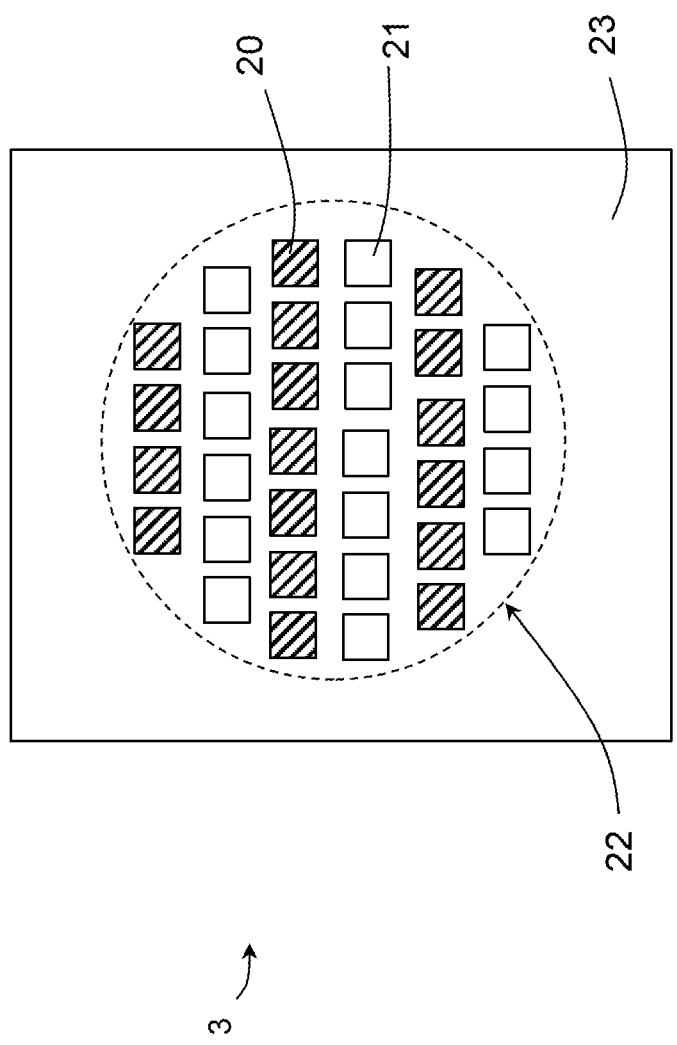
FIG. 3 shows an LED arrangement in a UVC light source according to an embodiment.

FIG. 3 shows an LED arrangement in a UVC light source 3 according to an embodiment example. In this embodiment example, the UVC light source 3 is designed as an LED module comprising a number of UVC LEDs 20 and a number of colored LEDs 21. The LEDs 20 and 21 are mounted within a circular mounting area 22 on a printed circuit board 23. In this embodiment example, the UVC LEDs 20 and the colored LEDs 21 are arranged alternately in dense rows. The number of UVC LEDs 20 and colored LEDs 21 is the same in this embodiment example. Due to the dense arrangement of the UVC LEDs and the colored LEDs 20, the UVC light generated by UVC LEDs and the light generated by the colored LEDs 21 can be formed into a beam by one and the same beam-shaping optics or beam-shaping element. The mounting area 22 of the printed circuit board 23 serves as a light-emitting surface or as a planar light source which generates both the UVC light and the visible, in particular, essentially monochromatic, light. By using the same beam-shaping optics, the UVC beam and the beam of visible light, especially in the far field, can be made to essentially overlap. The use of the monochromatic light can help to improve the visual perceptibility of the glow of the UVC light source 3 even in a well-lit room.

Figure 4:
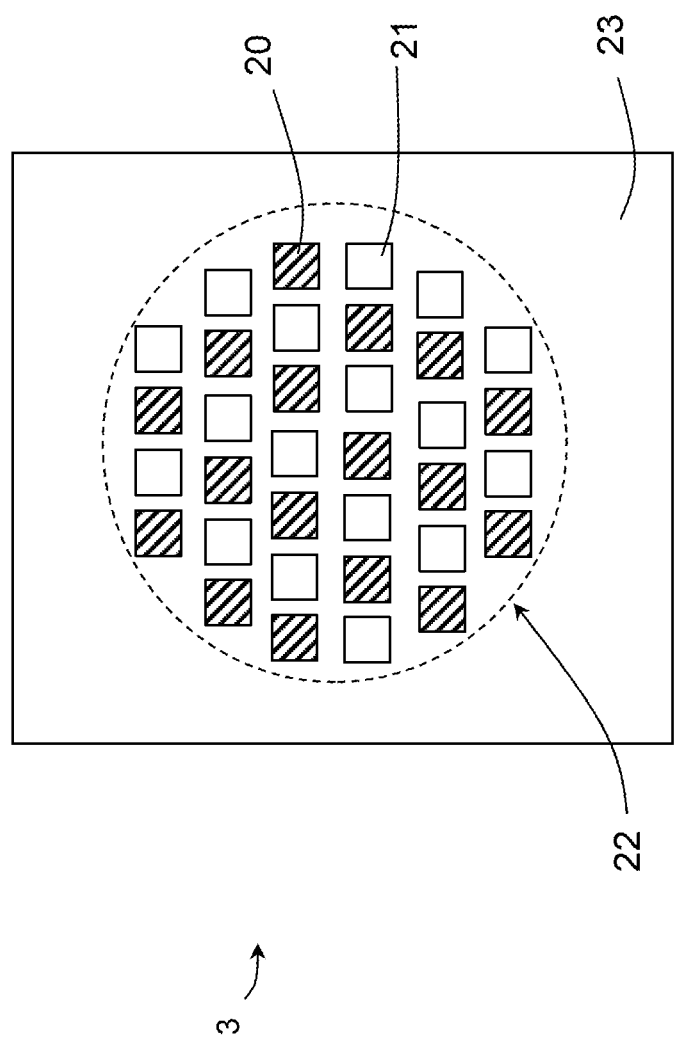
FIG. 4 shows an LED arrangement in a UVC light source according to another embodiment.

FIG. 4 shows an LED arrangement in a UVC light source 3 according to another embodiment. The LED arrangement of FIG. 4 is essentially the same as the LED arrangement of FIG. 3, wherein the UVC LEDs 20 and colored LEDs 21 are arranged in a chessboard-like manner in this case. The chessboard arrangement is particularly suitable for uniform mixing of the lights generated by different types of LEDs 20, 21, so that overlapping of corresponding light cones can already be improved with simple light beam-shaping optics.

Figure 5:
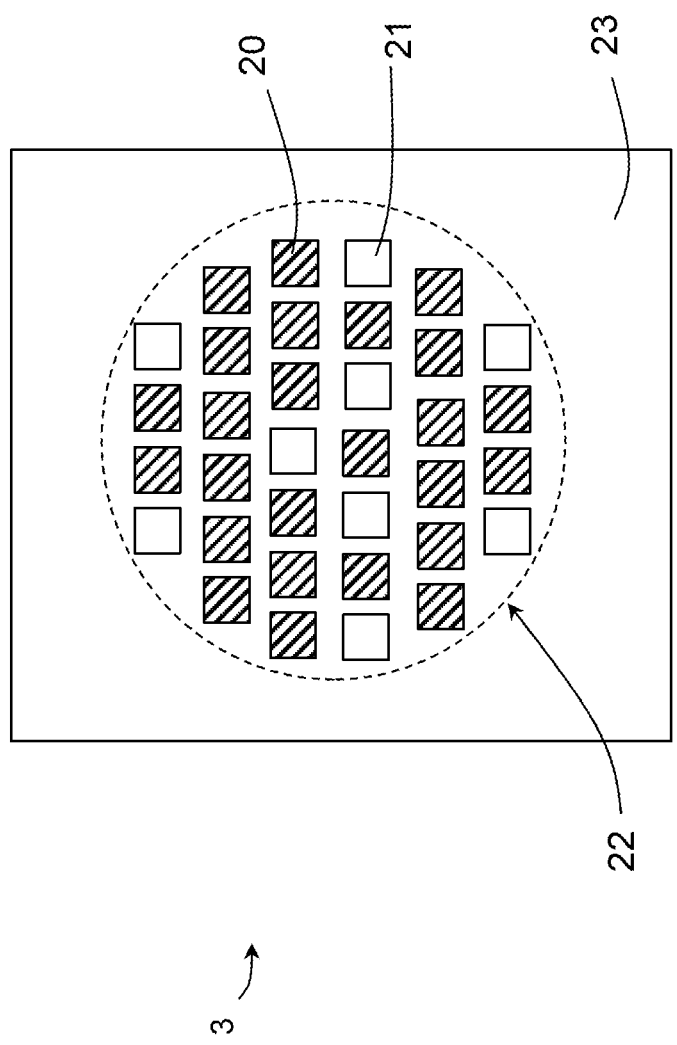
FIG. 5 shows an LED arrangement in a UVC light source according to a further embodiment.

FIG. 5 shows an LED arrangement in a UVC light source 3 according to a further embodiment. The LED arrangement of FIG. 5 corresponds essentially to the LED arrangements of FIGS. 3 and 4, wherein in overall fewer colored LEDs 21 than UVC LEDs 20 being mounted on the circuit board 23. This embodiment example is particularly intended to illustrate that the proportions of UVC light and colored light may vary depending on the embodiment. In particular, the number and/or physical size of the UVC LEDs may differ from the number and/or physical size of the colored LEDs.

The lighting device described above thus represents a safe lighting device for air disinfection, which is able to safely and reliably disinfect the air in the surrounding area, regardless of ceiling properties or other submissions in the room to be illuminated. In particular, the safety of the persons present is guaranteed even without external sensors such as access control, power management, or similar. The people present are either not exposed to UVC radiation at all or, if they are, then only with a well-controlled, harmless dose, which can be precisely defined in particular by the nature of the beam-reflecting element.

By means of the sensor system, the limited space between the first light source and the beam-reflecting element can also be monitored in a simple manner, for example, to detect the unexpected presence of objects or body parts and, if necessary, to cause the control electronics to switch off the UVC light source. One or more activity sensors can help to determine the sufficient UVC light dose to dim down the UVC light source if necessary, thus saving energy and extending the life of the lighting device.

The lighting device also provides a voluminous disinfection space which is exposed to UVC radiation for disinfection. In particular, due to the open construction and the natural air convection, further air masses, especially from the entire environment, can also be disinfected. The recycling effect described above also makes energy-efficient air disinfection possible.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be connected with each other in order to obtain further functions.

LIST OF REFERENCE SIGNS 1 lighting device
2 light source
3 UVC light source
4 beam-shaping element
5 beam-reflecting element
6 disinfection space
7 ceiling
8 floor
9 fastening mechanism
10 safety sensors
11 activity sensor
20 UVC LED
21 color LED
22 mounting area
23 printed circuit board
D Diameter of the beam-reflecting element
r radius of curvature of the beam-reflecting element
Y depth of the beam-reflecting element
Θ maximum aperture angle

What is claimed is:

1. A lighting device configured for disinfecting air in an environment, the lighting device comprising:
   at least one ultraviolet-C (UVC) light source configured for generating a UVC light;
   at least one first visible light source configured for generating a first visible light;
   a beam-shaping element configured for shaping the UVC light into a UVC beam in the form of a light cone with a predefined maximum aperture angle (θ) in the range of about 10-45°; and
   a beam-reflecting element in the form of a concave reflector configured for substantially completely reflecting the full UVC beam and radially focusing the resultant reflected UVC beam back to a point of origin of the UVC light, wherein the beam-reflecting element is connected downstream of the beam-shaping element in such a way that, between the beam-shaping element and the beam-reflecting element, there is a disinfection space for air disinfection which is freely accessible to the air, and wherein the beam-reflecting element is configured to emit the reflected UVC beam in a controlled manner such that at least a part of the reflected UVC beam is effectively recycled within the disinfection space, passing through the disinfection space;
   at least once in a first direction extending from the beam-shaping element to the beam-reflecting element; and at least once in a second direction extending from the beam-reflecting element to the beam-shaping element;

wherein in operation of the lighting device:
the UVC light impinges directly on the beam-reflecting element; and
the first visible light does not impinge directly on the beam-reflecting element.

2. The lighting device according to claim 1, wherein the beam-reflecting element is in the form of a spherical reflector.

3. The lighting device according to claim 1, wherein the lighting device is configured as a ceiling luminaire or a pendant luminaire.

4. The lighting device according to claim 3, wherein the lighting device is configured in such a way that, when the lighting device is mounted, the at least one UVC light source radiates primarily in a direction of a room ceiling.

5. The lighting device according to claim 1, further comprising:
a sensor system configured for providing current sensor information; and
control electronics configured for controlling the at least one UVC light source based on the current sensor information provided by the sensor system.

6. The lighting device according to claim 5, wherein:
the sensor system comprises at least one of:
a safety sensor configured for providing safety-relevant sensor information;
a presence sensor configured for detecting a presence of an object or a foreign body in the disinfection space;
a person presence sensor configured for detecting the presence of a person in the environment and for transmitting current person presence information to the control electronics; and
an air quality sensor configured for detecting one or more air quality parameters and for transmitting current air quality information to the control electronics; and
the control electronics are configured to at least one of:
control the at least one UVC light source based on the safety-relevant sensor information;
switch off the at least one UVC light source when the presence sensor indicates the presence of the object or the foreign body in the disinfection space;
control the lighting device based on the person presence information; and
control the lighting device based on the current air quality information.

7. The lighting device according to claim 5, wherein the sensor system comprises a UVC sensor configured for detecting UVC radiation.

8. The lighting device according to claim 1, wherein the beam-reflecting element is in the form of a parabolic reflector, a free-form reflector, or a segmented reflector.

9. The lighting device according to claim 1, wherein the beam-shaping element is substantially conical in shape or substantially funnel-shaped.

10. The lighting device according to claim 1, wherein the beam-shaping element is a lens optic.

11. The lighting device according to claim 1, wherein the beam-shaping element comprises a reflector or reflector array, on which the UVC light impinges in forming the UVC beam.

12. The lighting device according to claim 1, wherein the beam-shaping element comprises a lens or lens array, through which the UVC light passes in forming the UVC beam.

13. The lighting device according to claim 1, further comprising an adjustable fastening mechanism configured to adjust a distance between the beam-shaping element and the beam-reflecting element.

14. The lighting device according to claim 1, further comprising at least one second visible light source configured for generating a second visible light which at least one of:
mixes with the UVC beam in the disinfection space; and
substantially overlaps with the UVC beam.

15. The lighting device according to claim 14, wherein:
the at least one UVC light source comprises a plurality of UVC light-emitting diodes (LEDs);
the at least one second visible light source comprises a plurality of visible light LEDs; and
the UVC LEDs and the visible light LEDs are arranged in an alternating pattern such that any two neighboring LEDs differ in type of light emitted.

16. The lighting device according to claim 14, wherein:
the at least one UVC light source comprises a plurality of UVC light-emitting diodes (LEDs);
the at least one second visible light source comprises a plurality of visible light LEDs; and
a quantity of UVC LEDs present is greater than a quantity of visible light LEDs present.

17. The lighting device according to claim 1, wherein the beam-reflecting element is configured to be mounted directly onto a room ceiling.

18. The lighting device according to claim 1, wherein in operation of the lighting device, the first visible light does not mix with the UVC beam in the disinfection space.

19. The lighting device according to claim 14, wherein:
the at least one UVC light source comprises a plurality of UVC light-emitting diodes (LEDs);
the at least one second visible light source comprises a plurality of visible light LEDs; and
the UVC LEDs and the visible light LEDs are arranged in alternating rows such that a given row includes either UVC LEDs or visible light LEDs.

20. The lighting device according to claim 1, wherein the beam-reflecting element has a radius of curvature (r) and is physically separated from the at least one UVC light source by a distance (d) which satisfies the following condition:

$$½r < d <= 3/2r.$$

21. The lighting device according to claim 1, wherein the beam-reflecting element has a radius of curvature (r) and a diameter (D) which satisfies the following condition:

$$2r \sin θ < D < 4r \sin θ.$$

* * * * *